United States Patent
Doherty

[15] 3,681,369
[45] Aug. 1, 1972

[54] 2,6-BIS (TRIFLUOROMETHYL)-1H-IMIDAZO[4,5-B]PYRIDINE

[72] Inventor: George O. P. Doherty, RFD 6, Box 357, Greenfield, Ind. 46140

[22] Filed: April 20, 1970

[21] Appl. No.: 30,230

[52] U.S. Cl....................................260/296 H, 71/94
[51] Int. Cl..............................................C07d 31/42
[58] Field of Search................................260/296 H

[56] References Cited

UNITED STATES PATENTS 3,459,759  8/1969  Rochling et al................260/296

OTHER PUBLICATIONS

Chem. Abstracts Vol. 66, Page 5246, No. 55,487g, (March 1967).

Primary Examiner—Alan L. Rotman
Attorney—Everet F. Smith and Kathleen R. Schmoyer

[57]  ABSTRACT 2,6-Bis(trifluoromethyl)-1H-imidazo(4,5-b)pyridine, useful as a herbicide.

1 Claim, No Drawings

2,6-BIS(TRIFLUOROMETHYL)-1H-IMIDAZO[4,5-B]PYRIDINE

SUMMARY OF THE INVENTION

This invention is directed to 2,6-bis(trifluoromethyl)-1H-imidazo(4,5-b)pyridine, a compound of the following structure:

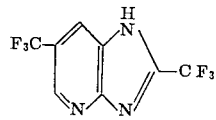

It is useful as a herbicide.

DETAILED DESCRIPTION OF THE INVENTION 2,6-Bis(trifluoromethyl)-1H-imidazo(4,5-b)pyridine is prepared by reacting 5-trifluoromethyl-2,3-pyridinediamine:

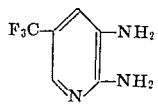

with trifluoroacetic acid to obtain an intermediate of the formula:

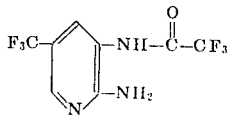

This intermediate is then cyclized to obtain the desired product. These preparations are illustrated by the following examples.

EXAMPLE 1: 5-TRIFLUOROMETHYL-3-(TRIFLUOROACETYL)-2,3-PYRIDINE-DIAMINE 5-trifluoromethyl-2,3-pyridinediamine (1.1 grams) in 10 milliliters of trifluoroacetic acid was refluxed for 20 hours and the solvent evaporated. The residue was shaken with water and ethyl acetate and the layers separated (the ethyl acetate layer showed starting material and a predominant new spot on TLC, $SiO_2/Et_2O$). The ethyl acetate layer was washed with 20 milliliters of 1 percent sodium carbonate, dried ($MgSO_4$), and evaporated to separate the desired 5-trifluoromethyl-3-(trifluoroacetyl)-2,3-pyridinediamine product as a residue. It was recrystallized from diethyl ether, m.p., 255°–61°C., with sublimation from 210°C.

Analysis, Calc.: C, 35.18; H, 1.85; N, 15:38.
Found: C, 34.97; H, 1.92; N, 15.33.

EXAMPLE 2. 2,6-BIS(TRIFLUOROMETHYL)-1H-IMIDAZO(4,5)PYRIDINE 5-trifluoromethyl-3-(trifluoroacetyl)-2,3-pyridinediamine (200 mg.) in 10 milliliters of concentrated hydrochloric acid was heated to 100°C. and maintained thereat for 1 hour. The reaction mixture was then neutralized with sodium hydroxide to pH of 2–3 and extracted with diethyl ether. The extract was dried over magnesium sulfate and solvent removed by evaporation to yield the desired 2,6-bis(trifluoromethyl)-1H-imidazo(4,5-b)-pyridine product. After recrystallization from chloroform, the product melted at 260°C. with sublimation from 235°C.

Analysis, Calc.: C, 37.66; H, 1.18; N, 16.47.
Found: C, 37.92; H, 1.43; N, 16.25.

The compound of the present invention is useful as a herbicide and can be employed in the control of numerous weed species. As is exemplified below, the compound controls weeds when utilized in either pre-emergent or post-emergent application. In general, the compound provides good control at rates of from 0.01 to 20.0 pounds or more per acre. At lower portions of this range, such as from rates of from 0.01 to 2.0 pounds per acre, the herbicidal effect is selective, and the compounds can be used for the selective control of weeds in such crops as corn, soybeans, cucurbits, and peanuts.

While the compound can be used alone, it is generally preferred that the compound be employed in combination with one or more adjuvants, such as a liquid diluent and a surface-active agent or a finely divided solid.

The following examples further illustrate the present invention.

EXAMPLE 3:

2,6-bis(trifluoromethyl)-1H-imidazo(4,5-b)pyridine was evaluated for pre-emergent application to various species of plants. The compound was formulated by suspending an amount of it in each of three 1:1 solutions of acetone and ethanol containing a small amount of a blend of two sulfonate-nonionic surfactants. Each of the suspensions was then further diluted with an aqueous solution of the same blend of surfactants; in the case of two of these suspensions, the dilution was done serially, so that a total of five treating solutions were obtained. Each of these solutions contained the compound in specified concentration, the blend of surfactants in a total concentration of 0.55 percent, and the acetone and ethanol each in a concentration of 4.15 percent.

A soil was prepared consisting of one part masonry sand and one part shredded top soil blended together in a cement mixer. One gallon of this soil was placed in a 21.5 × 31.5 cm. galvanized flat and patted down with a bench brush until level. A three-row marker was used to make 2½ cm. deep furrows in approximately two-fifths of the flat. Crop seeds consisting of four kernels of corn, five cotton seeds and five soybean seeds were placed in these furrows. A four-row template was then placed on the remaining soil and the indicated amounts of each of the following seeds were planted one species to each section: foxtail (millet), 100 mg.; rough pigweed, 30–50 mg.; and large crabgrass, 350–400 mg. Soil was then added to cover the entire flat to a depth of one-quarter inch.

In assaying the effect of the compound as a pre-emergent herbicide, flats prepared as above, taken on the day of planting, were placed in a chamber equipped with an air exhaust. Each of the prepared compositions containing the 2,6-bis(trifluoromethyl)-1H-imidazo(4,5-b)pyridine was uniformily applied with a modified DeVilbiss atomizer hooked to an air source, to obtain correspondingly different rates of application of the compound. Uniformly, however, 12.5 ml. of treating solution were applied per flat constituting a rate of 200 gallons per acre. Another flat was prepared, seeded, and covered with soil, but left untreated, to serve as a control. All flats were held for 12 to 13 days under normal greenhouse conditions, at which time injury ratings were made. The injury rating scale used was as follows:

1—no injury
2—slight injury
3—moderate injury
4—severe injury
5—death or no emergence When more than one determination was carried out at a given rate, an average value was calculated as the injury rating reported herein for that rate.

The following table sets forth the results of the evaluation.

TABLE I

Injury Rating on Pre-emergent Treatment

| Compound | Lbs./Acre | Corn | Cotton | Soybean | Crabgrass | Pigweed | Foxtail |
|---|---|---|---|---|---|---|---|
| 2,6-Bis(trifluoromethyl)-1H-imidazo(4,5-b)pyridine | 8 | 5 | 5 | 5 | 5 | 5 | 5 |
| | 4 | 4 | 5 | 4 | 5 | 5 | 5 |
| | 2 | 3.5 | 3.5 | 3.5 | 4.5 | 5 | 5 |
| | 1 | 2.5 | 2 | 2.5 | 4.5 | 5 | 5 |
| | ½ | 1 | 2 | 1 | 4 | 5 | 4 |

EXAMPLE 4:

2,6-Bis(trifluoromethyl)-1H-imidazo(4,5-b)pyridine was also evaluated for post-emergent application to plants. The evaluation was carried out in accordance with the procedures of example 3 except that the test solutions were applied about 9–13 days after the preparation and seeding of the flats. The results are as set forth in the following table:

TABLE II

Injury Rating on Post-emergent Treatment

| Compound | Lbs./Acre | Corn | Cotton | Soybean | Crabgrass | Pigweed | Foxtail |
|---|---|---|---|---|---|---|---|
| 2,6-Bis(trifluoromethyl)-1H-imidazo(4,5-b)pyridine | 8 | 5 | 5 | 5 | 5 | 5 | 5 |
| | 4 | 5 | 5 | 5 | 5 | 5 | 5 |
| | 2 | 5 | 5 | 5 | 5 | 5 | 5 |
| | 1 | 4 | 5 | 5 | 5 | 5 | 5 |
| | ½ | 2 | 4 | 3 | 5 | 5 | 4 |

EXAMPLE 5:

2,6-bis(trifluoromethyl)-2-(trifluoromethyl)-1H-imidazopyridine was evaluated further for selective pre-emergent herbicidal purposes. This evaluation was conducted in accordance with the procedures reported in example 3 except that two flats were used to enable evaluation with a greater number of species. The rate of application was one-quarter pound of the subject compound per acre. The ratings were as listed below:

| Corn | 1 |
| Cotton | 1 |
| Wheat | 2 |
| Rice | 1 |
| Cucumber | 1 |
| Tomato | 1 |
| Crabgrass | 4 |
| Mustard | 4 |
| Pigweed | 4 |
| Foxtail | 4 |
| Velvetleaf | 3 |

The 5-(trifluoromethyl)-2,3-pyridinediamine to be employed as the starting material in accordance with the present invention:

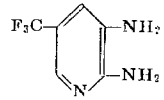

is prepared by nitration and subsequent reduction of 2-amino-5-(trifluoromethyl)pyridine:

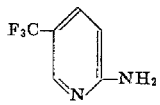

This compound, in turn, is prepared from 5-carboxy-2-hydroxypyridine by reaction with sulfur tetrafluoride in the presence of HF and subsequent treatment with sodium hydroxide to obtain 5-(trifluoromethyl)-2-hydroxypyridine. The hydroxy moiety of this compound can be converted in standard procedures to the desired 2-amino-5-(trifluoromethyl)pyridine compound, which is then nitrated and reduced to yield 5-(trifluoromethyl)-2,3-pyridinediamine.

I claim:

1. 2,6-bis(trifluoromethyl)-1H-imidazo(4,5-b)pyridine.

* * * * *